(12) United States Patent
Saeki et al.

(10) Patent No.: US 11,454,296 B2
(45) Date of Patent: Sep. 27, 2022

(54) DAMPER DEVICE

(71) Applicant: AISIN CORPORATION, Kariya (JP)

(72) Inventors: Tomohiro Saeki, Kariya (JP); Yasuhisa Iwasaki, Kariya (JP)

(73) Assignee: AISIN CORPORATION, Kariya (JP)

( * ) Notice: Subject to any disclaimer, the term of this patent is extended or adjusted under 35 U.S.C. 154(b) by 273 days.

(21) Appl. No.: 16/910,767

(22) Filed: Jun. 24, 2020

(65) Prior Publication Data

US 2021/0041007 A1 Feb. 11, 2021

(30) Foreign Application Priority Data

Aug. 9, 2019 (JP) .............................. JP2019-148056

(51) Int. Cl.
*F16F 15/129* (2006.01)
*F16F 15/123* (2006.01)
*F16D 3/14* (2006.01)
*F16D 13/64* (2006.01)

(52) U.S. Cl.
CPC ............ *F16F 15/1292* (2013.01); *F16D 3/14* (2013.01); *F16D 13/64* (2013.01); *F16F 15/12353* (2013.01); *F16D 2300/22* (2013.01); *F16F 2230/0064* (2013.01)

(58) Field of Classification Search
CPC ............ F16F 15/1292; F16F 15/12353; F16F 2228/06; F16F 2228/066; F16F 2230/0052; F16D 3/14; F16D 3/66; F16D 13/64; F16D 13/68; F16D 2300/22
See application file for complete search history.

(56) References Cited

U.S. PATENT DOCUMENTS

| 4,592,460 A * | 6/1986 | Kittel ................ F16F 15/12353 |
| | | 192/70.17 |
| 5,673,778 A * | 10/1997 | Ament .................. F16F 15/129 |
| | | 192/213.12 |
| 2008/0110719 A1 | 5/2008 | Saeki et al. |
| 2014/0087890 A1 | 3/2014 | Komuro et al. |
| 2015/0184718 A1 | 7/2015 | Sugiyama et al. |

(Continued)

FOREIGN PATENT DOCUMENTS

| JP | 4858096 B2 | 1/2012 |
| JP | 5656949 B2 | 1/2015 |
| JP | 6024336 B2 | 11/2016 |

(Continued)

*Primary Examiner* — Richard M Lorence
(74) *Attorney, Agent, or Firm* — Buchanan Ingersoll & Rooney PC (57) ABSTRACT

A damper device includes: a first rotary body including a first plate rotating around a rotation shaft and a second plate disposed facing the first plate and integrally rotating with the first plate; a second rotary body rotating relative to the first rotary body; a control plate disposed between the first plate and the second rotary body in an axial direction and engaged with the second rotary body to rotate integrally therewith; a first thrust member a part of which is disposed between the first plate and the control plate in the axial direction and engaged with the first plate to rotate integrally therewith; and a second thrust member a part of which is disposed between the second plate and the second rotary body and engaged with the second plate to rotate integrally with the first rotary body.

7 Claims, 10 Drawing Sheets

(56) References Cited

U.S. PATENT DOCUMENTS

2018/0149231 A1    5/2018  Nasu et al.

FOREIGN PATENT DOCUMENTS

| JP | 2017015224 A | 1/2017 |
| JP | 2017172707 A | 9/2017 |
| JP | 6292293 B2 | 3/2018 |
| JP | 6471486 B2 | 2/2019 |

* cited by examiner

DAMPER DEVICE

CROSS REFERENCE TO RELATED APPLICATIONS

This application is based on and claims priority under 35 U.S.C. § 119 to Japanese Patent Application 2019-148056, filed on Aug. 9, 2019, the entire content of which is incorporated herein by reference.

TECHNICAL FIELD

This disclosure relates to a damper device.

BACKGROUND DISCUSSION

In a vehicle or the like, a damper device is provided on a torque transmission path between a driving source such as an engine and a transmission. The damper device absorbs vibration of a torque transmitted from the driving source to the transmission. The damper device is assembled in, for example, a clutch device.

As a general configuration of the damper device, a technique is known in which a coil spring is interposed between a disk plate serving as an input member and a hub serving as an output member, which are rotatable relative to each other, and elastic deformation of the coil spring is used to absorb and attenuate torque fluctuation. In addition to the elastic deformation of the coil spring, a technique is known in which a sliding torque (hysteresis torque) based on the relative rotation between the disk plate and the hub is generated to further absorb the torque fluctuation.

As a specific configuration of the damper device, for example, Japanese Patent No. 6024336 specification (Reference 1) discloses a damper device including a damper portion 2 including a coil spring (reference numeral 15 in Reference 1) and the like as a constituent element, and a hysteresis portion 3 including a control plate (reference numeral 18 in Reference 1), a thrust member (reference numerals 21 and 22 in Reference 1), and a disk spring (reference numeral 23 in Reference 1) that presses the thrust member as constituent elements. In the hysteresis portion 3 of Reference 1, the thrust member (the second thrust member 22 in Reference 1) is displaced in an axial direction so that a pressing force applied from the disk spring 23 to the second thrust member 22 is varied and a magnitude of a hysteresis torque generated between the second thrust member 22 and the control plate 18 is varied.

However, in the damper device disclosed in Reference 1, the pressing force from the disk spring 23 loaded on the second thrust member 22 is varied (the hysteresis torque is varied) corresponding to the magnitude of a twist angle related to relative rotation. In order to deal with a variable amount of the hysteresis torque, it is necessary to ensure an expansion and contraction stroke of the disk spring 23 in the axial direction. As a result, an axial length of the hysteresis portion 3 becomes large. In the damper device disclosed in Reference 1, a concave-convex surface (inclined surface) is formed on an abutting surface of the control plate 18 and the second thrust member 22, and the pressing force of the disk spring 23 is varied by displacing the second thrust member 22 in the axial direction at all twist angles related to the relative rotation corresponding to a shape of the concave-convex surface of the control plate 18 and the second thrust member 22. Therefore, the disk spring 23 basically expands and contracts in time at all twist angles of the relative rotation and an expansion and contraction frequency increases. As a result, characteristics of the disk spring 23 are likely to change due to durability and the like, and a desired hysteresis torque is less likely to be exhibited gradually.

A need thus exists for a damper device which is not susceptible to the drawback mentioned above.

SUMMARY

A damper device according to an aspect of this disclosure includes a first rotary body including at least a first plate that rotates around a rotation shaft and a second plate that is disposed to face the first plate and integrally rotates with the first plate around the rotation shaft; a second rotary body that rotates relative to the first rotary body around the rotation shaft; a control plate that is disposed between the first plate and the second rotary body in an axial direction and is engaged with the second rotary body to rotate integrally with the second rotary body; a first thrust member at least a part of which is disposed between the first plate and the control plate in the axial direction and that is engaged with the first plate to rotate integrally with the first rotary body around the rotation shaft; and a second thrust member at least a part of which is disposed between the second plate and the second rotary body in the axial direction, and that is engaged with the second plate to rotate integrally with the first rotary body around the rotation shaft. The first thrust member is biased by a biasing member supported by the first plate in a direction to be pressed against the control plate to generate a first frictional force between the first thrust member and the control plate, the control plate is separated from the first plate in a case other than a specific state in which the second rotary body rotates relative to the first rotary body in a predetermined direction by a predetermined twist angle or more and abuts against and slides on the first plate in the specific state to generate a second frictional force between the control plate and the first plate, and the second thrust member abuts against and slides on the second rotary body to generate a third frictional force between the second thrust member and the second rotary body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Various embodiments disclosed here will be described below with reference to the accompanying drawings. In the drawings, the same components are denoted by the same reference numerals. It should also be noted that constituent elements illustrated in some drawings may be omitted in other drawings for convenience of description. Furthermore, the attached drawings are not necessarily drawn to scale.

1. Configuration of Damper Device

Figure 1:
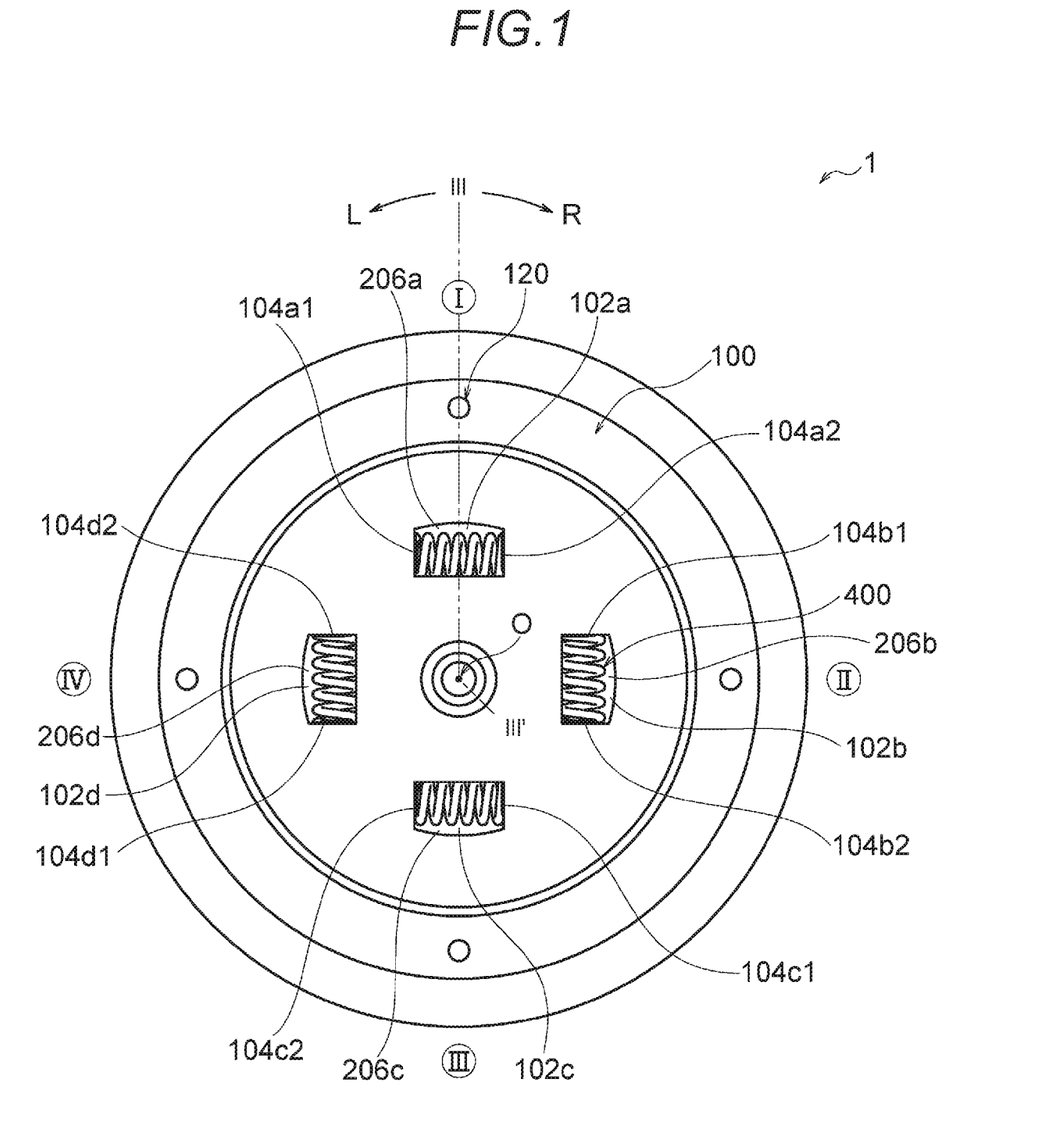
FIG. 1 is a schematic top view showing a configuration of a damper device according to an embodiment.
Figure 2:
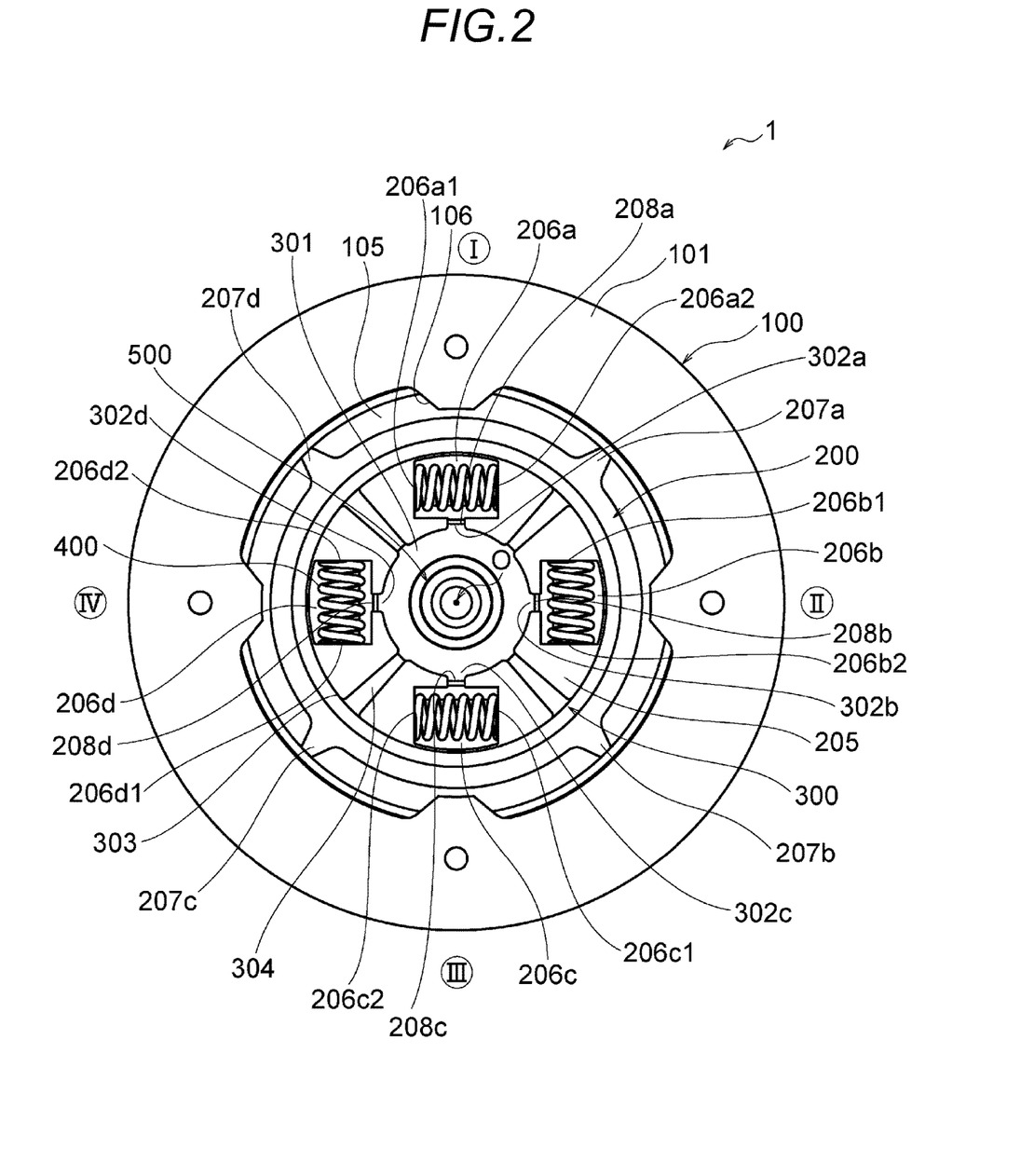
FIG. 2 is a schematic top view showing the configuration of the damper device shown in FIG. 1 in which a part of constituent elements is omitted.
Figure 3:
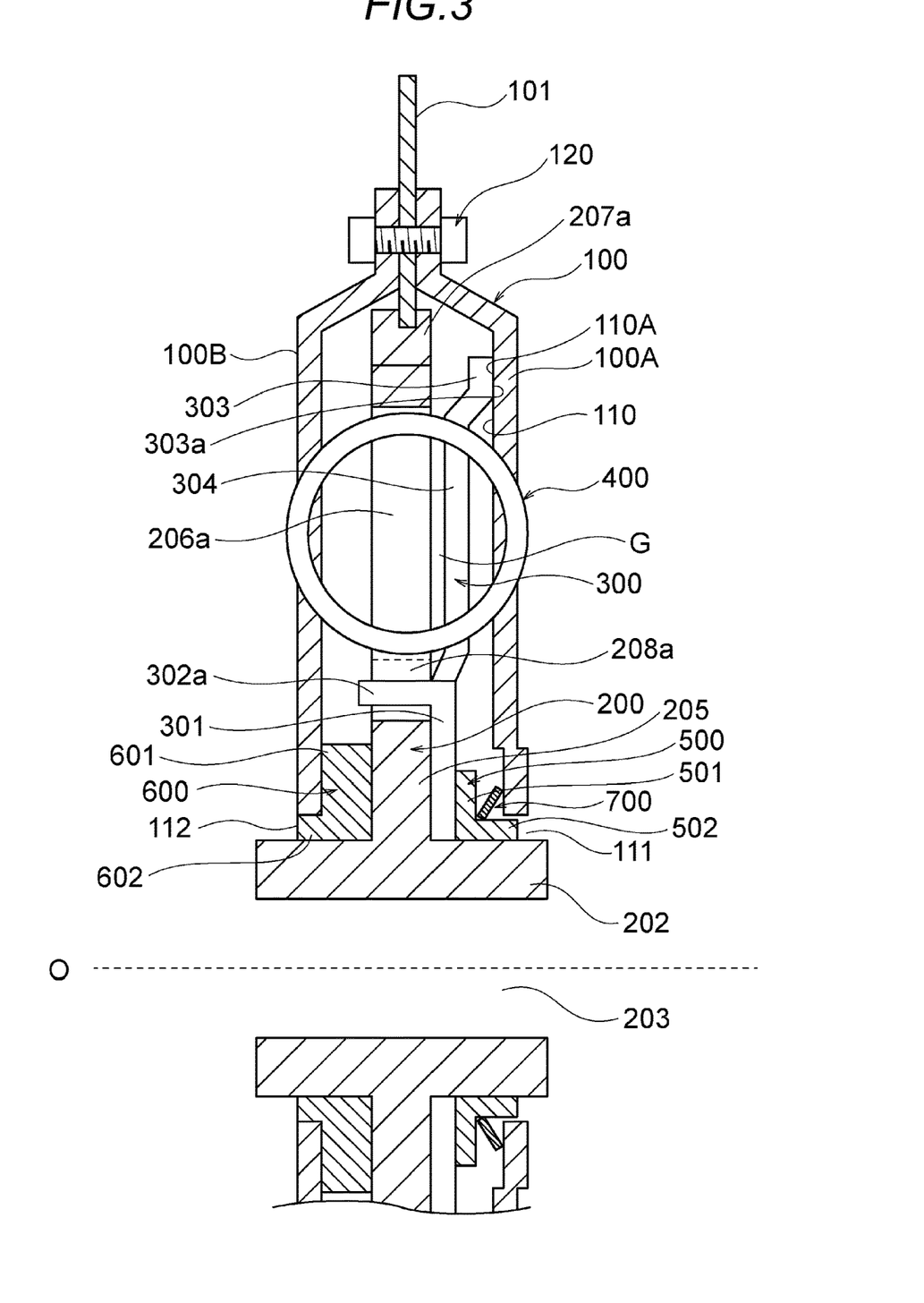
FIG. 3 is a schematic cross-sectional view showing the configuration of the damper device shown in FIG. 1 from a III-III' line to an R side.
Figure 4:
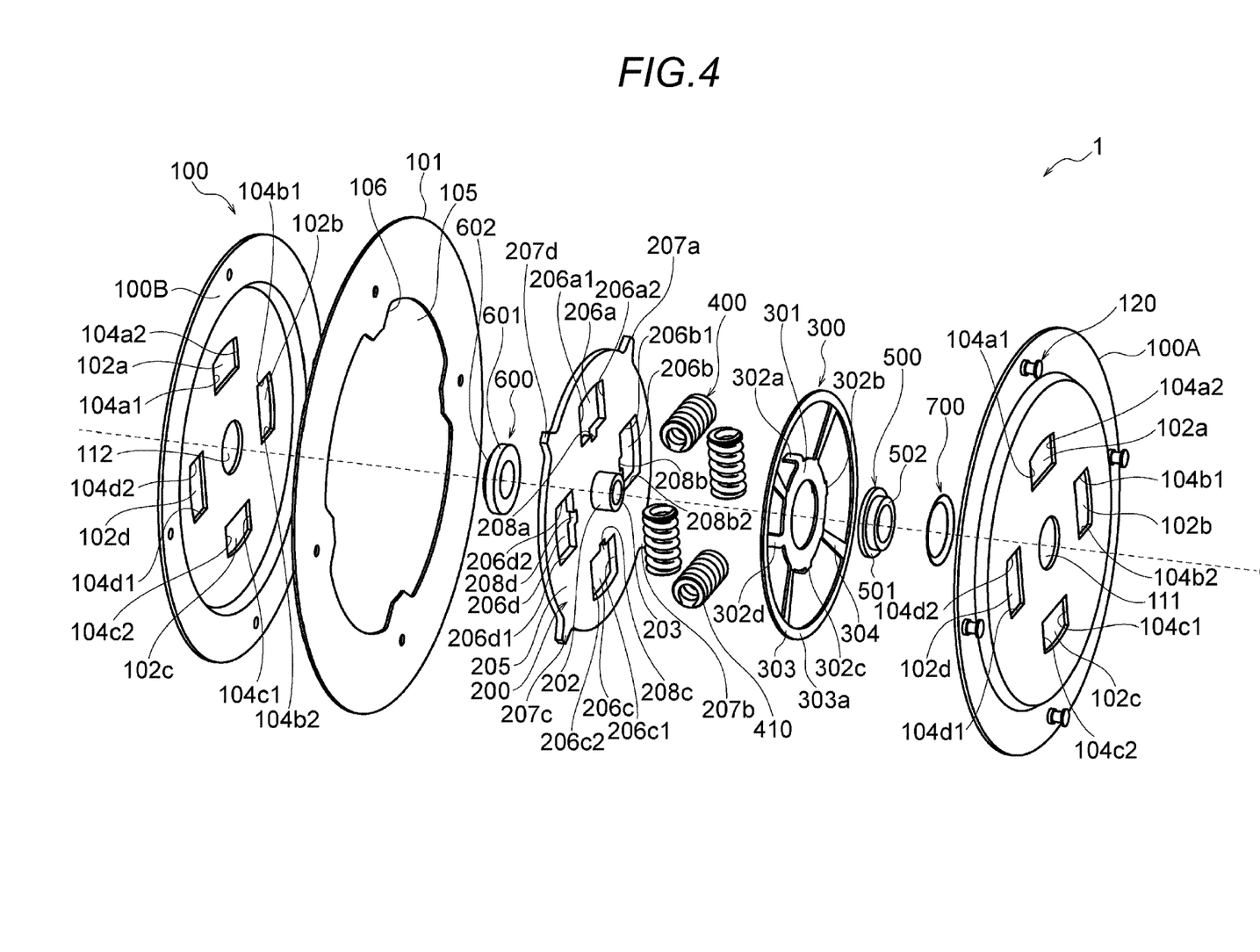
FIG. 4 is a schematic perspective view showing the configuration of the damper device according to the embodiment in which the constituent elements are decomposed.
Figure 5:
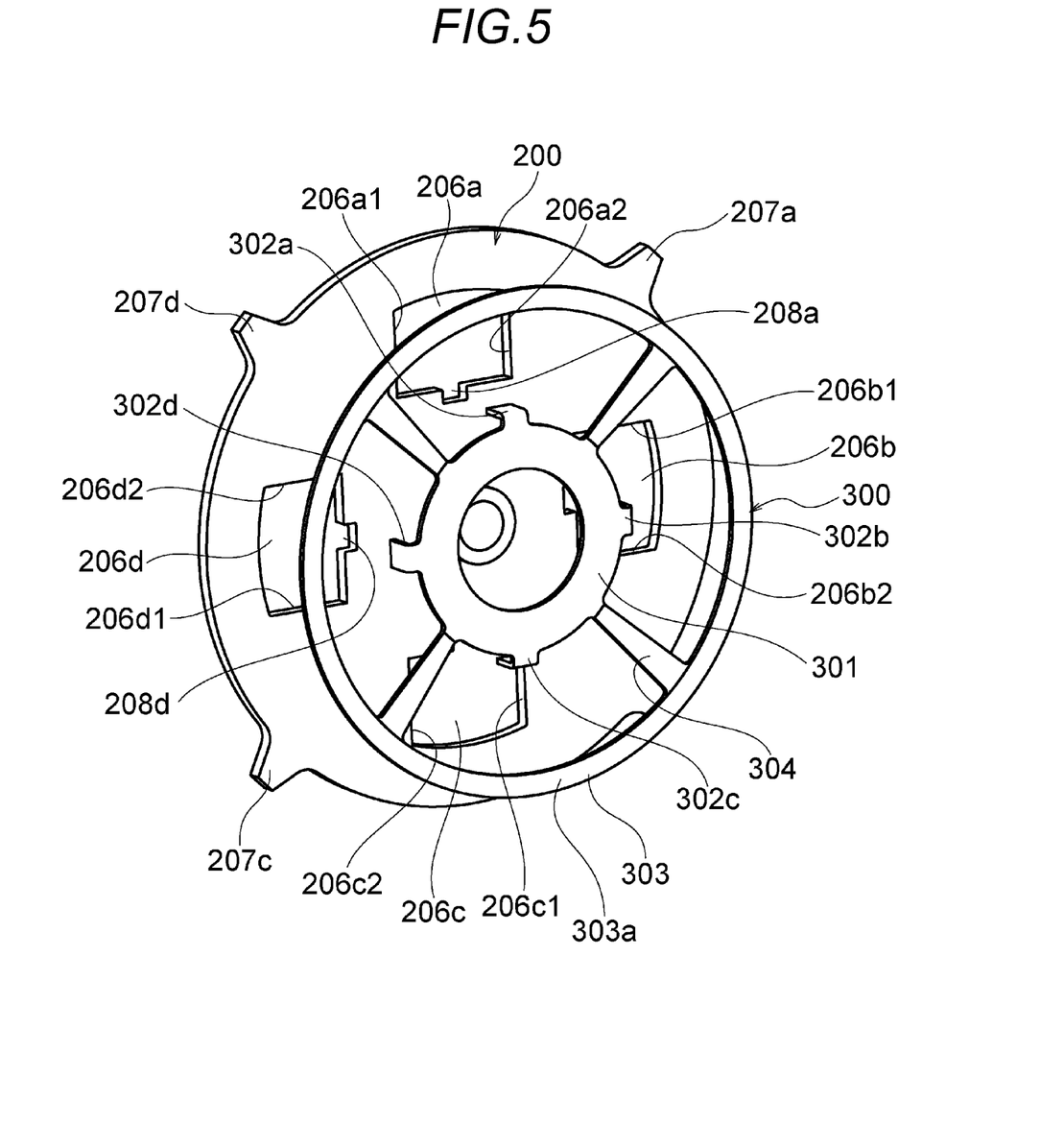
FIG. 5 is an enlarged schematic perspective view of a second rotary body and a control plate of the damper device according to the embodiment.
Figure 6:
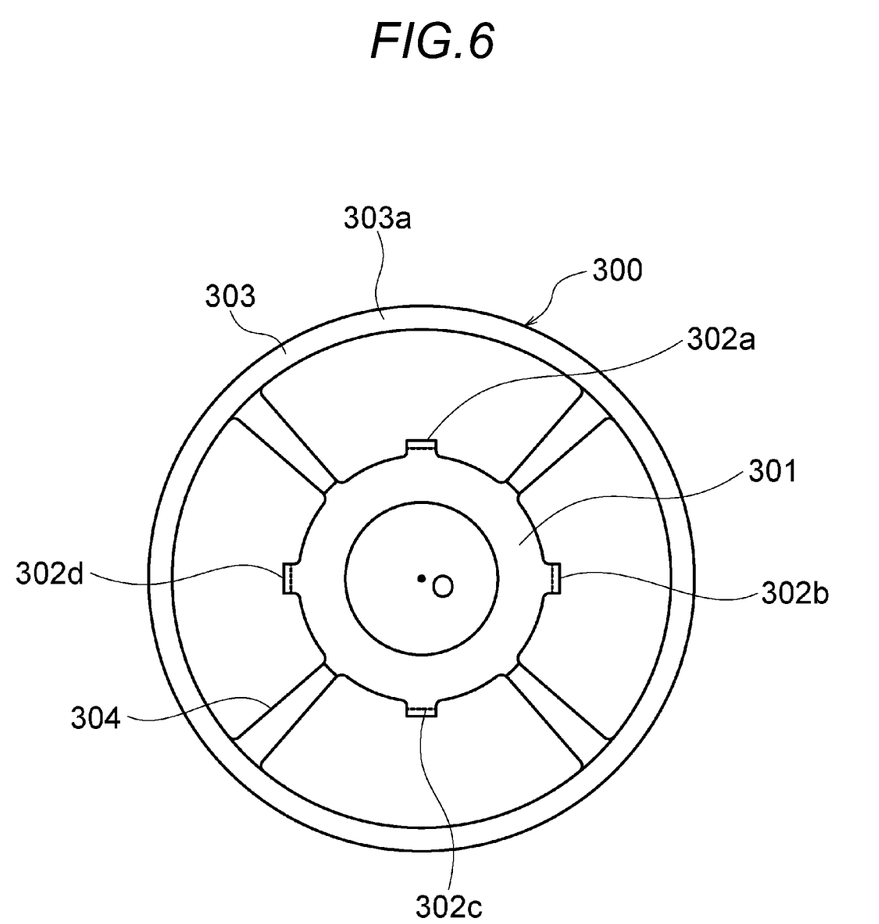
FIG. 6 is an enlarged schematic top view showing the control plate of the damper device according to the embodiment.

An overview of an overall configuration of a damper device according to an embodiment will be described with reference to FIGS. 1 to 6. FIG. 1 is a schematic top view showing a configuration of a damper device 1 according to an embodiment. FIG. 2 is a schematic top view showing the configuration of the damper device 1 shown in FIG. 1 in which a part of constituent elements is omitted. FIG. 3 is a schematic cross-sectional view showing the configuration of the damper device 1 shown in FIG. 1 from a III-III' line to an R side. FIG. 4 is a schematic perspective view showing the configuration of the damper device 1 according to the embodiment in which the constituent elements are decomposed. FIG. 5 is an enlarged schematic perspective view of a second rotary body 200 and a control plate 300 of the damper device 1 according to the embodiment. FIG. 6 is an enlarged schematic top view showing the control plate 300 of the damper device 1 according to the embodiment.

The damper device 1 according to the embodiment transmits a driving force from a driving source (not shown) such as an engine or a motor to a transmission by, for example, being interposed between a flywheel (not shown) and a pressure plate (not shown). Since the structure of interposing the damper device 1 between the flywheel and the pressure plate is known, a detailed description thereof will be omitted.

The damper device 1 absorbs and attenuates torque fluctuation. As shown in FIGS. 1 to 6, the damper device 1 mainly includes a disk plate 100 as a first rotary body 100 to which power is transmitted from the flywheel, the hub 200 as a second rotary body, the control plate 300 as a third rotary body, an elastic body 400, a first thrust member 500, a second thrust member 600, and a biasing member 700. The damper device 1 may have a limiter function (not shown) of a general structure for generating a slip when the torque fluctuation cannot be absorbed. In the present specification, an axial direction means a direction parallel to a rotation axis O, and a radial direction means a direction orthogonal to the rotation axis O, and a circumferential direction means a direction around the rotation axis O.

1-1. First Rotary Body 100

In the damper device 1, the power from the driving source such as the engine or the motor is transmitted via the flywheel to the disk plate 100 as the first rotary body on an input side in the power transmission path. The disk plate 100 is formed of, for example, a metal material, and is rotatably provided around the rotation axis O with the hub 200 or the like as the second rotary body to be described later interposed therebetween as is shown in FIGS. 1 to 4. The disk plate 100 includes a first plate 100A and a second plate 100B as a pair of substantially disk-shaped plate members provided on both sides of the hub 200 in the axial direction (the second plate 100B is provided to face the first plate 100A in the axial direction). As shown in FIG. 4, the first plate 100A and the second plate 100B have a symmetrical shape in the axial direction and are integrally rotatable by being coupled by a plurality of rivets 120 in the vicinity of an outer periphery. The substantially annular lining plate 101 is interposed therebetween and is capable of appropriately adjusting positions of the two plates in the axial direction.

When the power from the driving source such as the engine or the motor is transmitted from the flywheel to the lining plate 101 via a friction material (not shown) provided on the lining plate 101, the power is transmitted from the lining plate 101 to the first plate 100A and the second plate 100B in the vicinity of the rivets 120.

The first plate 100A and the second plate 100B cooperate with each other, and, as shown in FIGS. 1 and 4, have a shape that bulges in the axial direction so as to form an accommodation region (four accommodation regions in the example shown in FIG. 1) that accommodates the elastic body 400 to be described later. The elastic body 400 is corresponding to each of regions I to IV. Each accommodation region extends in a substantially straight shape or a substantial arc shape in the circumferential direction of the disk plate 100 to accommodate the elastic body 400 extending in the circumferential direction of the disk plate 100. The regions I to IV refer to four regions each having a fan shape of approximately 90 degrees, as shown in FIG. 1, when the damper device 1 is viewed from an upper surface.

More specifically, with reference to FIG. 1, the first plate 100A and the second plate 100B form a first accommodation region 102a, a second accommodation region 102b, a third accommodation region 102c, and a fourth accommodation region 102d extending in the circumferential direction respectively corresponding to the regions I to IV. As will be described later, the hub 200 is provided with window holes 206a, 206b, 206c, and 206d corresponding to the first accommodation region 102a, the second accommodation region 102b, the third accommodation region 102c, and the fourth accommodation region 102d, respectively.

Focusing on the region IV, as shown in FIG. 1, each of the first plate 100A and the second plate 100B has one end surface (fourth one end surface) $104d_1$ and the other end surface (fourth other end surface) $104d_2$ facing the one end surface $104d_1$ as side walls surrounding the fourth accommodation region 102d. The fourth one end surface $104d_1$ and the fourth other end surface $104d_2$, as an example, extend along an axial direction of the disk plate 100.

Similarly, focusing on the region I, each of the first plate 100A and the second plate 100B has one end surface (first one end surface) $104a_1$ and the other end surface (first other end surface) $104a_2$ facing the one end surface $104a_1$ as side walls surrounding the first accommodation region 102a. Focusing on the region II, each of the first plate 100A and the second plate 100B has one end surface (second one end surface) $104b_1$ and the other end surface (second other end surface) $104b_2$ facing the one end surface $104b_1$ as side walls surrounding the second accommodation region 102b. Focusing on the region III, each of the first plate 100A and the second plate 100B has one end surface (third one end surface) $104c_1$ and the other end surface (third other end surface) $104c_2$ facing the one end surface $104c_1$ as side walls surrounding the third accommodation region $102c$. These side walls abut against (engage with) the elastic bodies 400, which will be described later.

As shown in FIG. 3, the lining plate 101 in the disk plate 100 is disposed at the same axial position as the hub 200 (in a straight line in the radial direction). Therefore, as shown in FIGS. 2 and 4, a notch 105 is provided in each of the regions I to IV in the lining plate 101 to allow the hub 200 to move (relatively rotate) in the circumferential direction. An outer edge portion of the notch 105 functions as a regulation portion 106 that regulates excessive relative rotation of the hub 200.

On an inner surface 110 of the first plate 100A, a surface facing a first concave-convex surface 303a of a first sliding portion 303 provided on the control plate 300 to be described later is provided with a second concave-convex surface 110A corresponding to the first concave-convex surface 303a. The second concave-convex surface 110A faces the first concave-convex surface 303a and has a concave shape and a convex shape that are paired with a convex shape and a concave shape of the first concave-convex surface 303a.

A radially inner end portion of the inner surface 110 of the first plate 100A supports the biasing member 700 which will be described later. Conversely, the first plate 100A is biased by the biasing member 700 in a direction away from the control plate 300 (first sliding portion 303). Accordingly, the first sliding portion 303 (first concave-convex surface 303a) of the control plate 300 and the second concave-convex surface 110A of the first plate 100A are separated from each other except for a specific state to be described later.

The first plate 100A is provided with a first engagement hole 111 that engages the first thrust member 500 to be described later to integrate the first thrust member 500 with the first plate 100A (disk plate 100).

The second plate 100B is provided with a second engagement hole 112 that engages the second thrust member 600 to be described later to integrate the second thrust member 600 with the second plate 100B (disk plate 100).

1-2. Hub 200

The hub 200 as the second rotary body functions as an output member in the damper device 1. The hub 200 is formed of, for example, a metal material, has a general disk shape as a whole. The hub 200 is interposed between the first plate 100A and the second plate 100B and is rotatable relative to the disk plate 100 (first plate 100A and second plate 100B) around the rotation axis O. As shown in FIGS. 3 and 4, the hub 200 can be spline-coupled to an input shaft (not shown) of the transmission by inserting the input shaft into a through hole 203 formed in a substantially cylindrical portion 202. The hub 200 includes a disk portion 205 extending radially outward from the cylindrical portion 202.

As described above, the disk portion 205 is provided with the window holes 206a, 206b, 206c, and 206d corresponding to the first accommodation region 102a, the second accommodation region 102b, the third accommodation region 102c, and the fourth accommodation region 102d at equal intervals. The window holes 206a to 206d provided in the hub 200 are corresponding to the elastic body 400 to be described later. That is, the elastic body 400 is accommodated in each of the window holes 206a to 206d.

The window hole 206a is corresponding to the region I, has an engagement portion on one end (first end engagement portion) $206a_1$ and an engagement portion on the other end (first other end engagement portion) $206a_2$ facing the first end engagement portion $206a_1$, and is engaged with the elastic body 400. Similarly, the window hole 206b is corresponding to the region II, has an engagement portion on one end (second one end engagement portion) $206b_1$ and an engagement portion on the other end (second other end engagement portion) $206b_2$ facing the second one end engagement portion $206b_1$, and is engaged with the elastic body 400. The window hole 206c is corresponding to the region III, has an engagement portion on one end (third one end engagement portion) $206c_1$ and an engagement portion on the other end (third other end engagement portion) $206c_2$ facing the third one end engagement portion $206c_1$, and is engaged with the elastic body 400. Further, the window hole 206d is corresponding to the region IV, has an engagement portion on one end (fourth one end engagement portion) $206d_1$ and an engagement portion on the other end (fourth other end engagement portion) $206d_2$ facing the fourth one end engagement portion $206d_1$, and is engaged with the elastic body 400.

Projections 207a, 207b, 207c, and 207d are provided at radially end portions of the disk portion 205 corresponding to the regions I to IV. The projections 207a to 207d are accommodated in notches 105 provided in the lining plate 101 such that the hub 200 can rotate relative to the disk plate 100. When the hub 200 relatively rotates by a predetermined twist angle, the projections 207a to 207d abut against the regulation portion 106, which is the outer edge portion of the notch 105, to regulate excessive relative rotation of the hub 200.

As shown in FIGS. 2 to 5, grooves 208a, 208b, 208c, and 208d for receiving claw portions 302a to 302d of the control plate 300, which will be described later, are provided on an inner side in the radial direction of the above-mentioned window holes 206a, 206b, 206c, and 206d. Although each of the grooves 208a to 208d is continuous from each of the window holes 206a to 206d in the damper device 1 according to the embodiment, the grooves 208a to 208d are not limited thereto, and may be provided at any portion of the disk portion 205.

1-3. Control Plate 300

The control plate 300 is formed of, for example, a metal material such as spring steel and has a substantially annular shape as a whole. As shown in FIGS. 3 and 4, the control plate 300 is provided between the first plate 100A and the hub 200 in the axial direction. The control plate 300, as shown in FIGS. 2 to 6, includes a first annular portion 301 having a predetermined outer diameter, the claw portions 302a, 302b, 302c, and 302d corresponding to the respective grooves 208a, 208b, 208c, and 208d in the hub 200 provided near the radially outer end portion of the first annular portion 301 (collectively, referred to as "claw portion 302"), a second annular portion 303 having an outer diameter larger than that of the first annular portion 301 (not necessary to exhibit a continuous annular shape), and a coupling portion 304 that couples the first annular portion 301 with the second annular portion 303.

As shown in FIGS. 2 to 6, the first annular portion 301 abuts against and slides on the first thrust member 500 to be described later and functions as a second sliding portion (second sliding portion 301) that generates a first frictional force between the first annular portion 301 and the first thrust member 500. The first frictional force constantly occurs when the disk plate 100 and the hub 200 rotate relative to each other, and can be used as a relatively small hysteresis torque in the damper device 1.

As shown in FIGS. 2 to 6, the claw portions 302a to 302d are engaged with the respective grooves 208a, 208b, 208c, and 208d provided in the hub 200. Accordingly, the control plate 300 can rotate integrally with the hub 200. The shape of the claw portions 302a to 302d (shape of the corresponding groove portions 208a to 208d) is not particularly limited as long as the control plate 300 is engaged with the hub 200 and can rotate integrally therewith.

As shown in FIGS. 2 to 6, when the hub 200 is in a specific state of rotating relative to the disk plate 100 in a predetermined direction (for example, a negative side) by a predetermined twist angle or more, the second annular portion 303 abuts against and slides on the first plate 100A, and functions as a first sliding portion (first sliding portion 303) that generates a second frictional force between the second annular portion 303 and the first plate 100A (see FIG. 3). On the other hand, when the hub 200 does not rotate relative to the disk plate 100 by the predetermined twist angle in the predetermined direction (or when not relatively rotated), the second annular portion (first sliding portion) 303 is separated from the first plate 100A, and in this case, the second frictional force is not generated. The second frictional force is generated only when the disk plate 100 and the hub 200 rotate relative to each other in the specific state, and can be used as a relatively large hysteresis torque.

A surface of the first sliding portion 303 that faces (abuts against and slides on) the first plate 100A is formed with the first concave-convex surface 303a that is uneven in the axial direction (see FIGS. 8A to 8E). The first concave-convex surface 303a has a shape corresponding to the second concave-convex surface 110A formed on the inner surface 110 of the first plate 100A. That is, in the specific state, the first concave-convex surface 303a and the second concave-convex surface 110A abut and slide against each other, and are separated from each other when they are not in the specific state.

It is preferable that a resin member is separately fixed to at least one of the first concave-convex surface 303a and the surface facing the first concave-convex surface 303a of the first plate 100A. Accordingly, a larger second frictional force can be reliably generated. In addition, in place of the resin member, a coating layer formed of a compound containing 3d transition metal is more preferably formed on at least one of the first concave-convex surface 303a and the surface facing the first concave-convex surface 303a of the first plate 100A. Accordingly, a larger second frictional force can be more reliably generated.

As shown in FIGS. 2 to 6, the coupling portion 304 couples the first annular portion 301 with the second annular portion 303 in the radial direction. In the above-described specific state, the coupling portion 304 has a function of transmitting the pressing force in the axial direction input from the first plate 100A to the first sliding portion 303 (control plate 300) to the hub 200. The coupling portion 304 is preferably elastically deformed in the axial direction. That is, with the coupling portion 304 elastically deformed in the axial direction, the pressing force in the axial direction input to the first sliding portion 303 is reliably transmitted to the hub 200. Considering that the coupling portion 304 is largely elastically deformed, it is preferable that a gap G extending in the radial direction is provided between the coupling portion 304 and the hub 200, and it is further preferable to increase a distance in the radial direction (operation diameter of the pressing force) between the claw portion 302 and the first sliding portion 303 (to increase the gap therebetween).

Summing up the above, as shown in FIG. 3, it is preferable that the first sliding portion 303 is disposed radially outward than the claw portion 302 and the second sliding portion 301 is disposed radially inward than the claw portion 302 when the claw portion 302 is used as a reference.

1-4. Elastic Body 400

In the elastic body 400, as shown in FIGS. 1 to 4, one coil spring is used in each of the regions I to IV. Two or more coil springs may be disposed in series in each region.

In the embodiment shown in FIGS. 1 to 4, as an example, since the disk plate 100 has four accommodation regions, that is, the first accommodation region 102a, the second accommodation region 102b, the third accommodation region 102c, and the fourth accommodation region 102d (correspondingly, the hub 200 is also provided with the window holes 206a, 206b, 206c, and 206d as described above), one elastic body 400 is accommodated in each of the four accommodation regions, that is, corresponding to each of the regions I to IV. In each of the regions I to IV, the elastic body 400 may be configured such that both ends thereof are supported by a pair of resin sheet members (not shown) in each of the accommodation regions.

Focusing on the region I, one end of the elastic body 400 is engaged with the first one end surface $104a_1$ of the disk plate 100 (first plates 100A and 100B) and the first one end engagement portion $206a_1$ provided on the hub 200. The other end of the elastic body 400 is engaged with the first other end surface $104a_2$ of the disk plate 100 (first plates 100A and 100B) and the first other end engagement portion $206a_2$ provided on the hub 200. Similarly, in the regions II to IV, the elastic body 400 is engaged with the disk plate 100 and the hub 200.

With the above configuration, the elastic body 400 can elastically couple the disk plate 100 and the hub 200 in a rotational direction. That is, when the power from the driving source such as the engine or the motor is transmitted in order of the disk plate 100, the elastic body 400, and the hub 200, when the disk plate 100 and the hub 200 rotate relative to each other, the elastic body 400 is compressively deformed to absorb the torque fluctuation.

1-5. First Thrust Member 500

The first thrust member 500 is formed of, for example, a resin material, and includes a substantially annular first portion 501 and a substantially cylindrical second portion 502 as a whole. As shown in FIGS. 2 to 4, the first portion 501 is disposed between the first plate 100A and the control plate 300 in the axial direction via the biasing member 700 which will be described later. The second portion 502 is corresponding to the first engagement hole 111 provided in the first plate 100A and is fitted (engaged) with the first engagement hole 111. Accordingly, the first thrust member 500 is integrated with the first plate 100A (disk plate 100), and rotates integrally with the disk plate 100 around the rotation axis O.

The biasing member 700 is provided between the first portion 501 of the first thrust member 500 and the first plate 100A. The first thrust member 500 is pressed against the control plate 300 by the biasing member 700. Accordingly, the first portion 501 abuts against and slides on the second sliding portion 301 of the control plate 300 to generate the first frictional force with the control plate 300. The first frictional force constantly occurs when the disk plate 100 and the hub 200 rotate relative to each other as described above, and can be used as a relatively small hysteresis torque in the damper device 1.

1-6. Second Thrust Member 600

The second thrust member 600 is formed of, for example, a resin material, and includes a substantially annular third portion 601 and a substantially cylindrical fourth portion 602 as a whole. As shown in FIGS. 2 to 4, the third portion 601 is disposed between the second plate 100B and the hub 200 in the axial direction. The fourth portion 602 is fitted (engaged) into the second engagement hole 112 provided in the second plate 100B. Accordingly, the second thrust member 600 is integrated with the second plate 100B (disk plate 100), and rotates integrally with the disk plate 100 around the rotation axis O.

In the specific state described above, when the pressing force in the axial direction (for example, a left side on the paper surface in FIG. 3) is transmitted to the hub 200, since the hub 200 is pressed against the third portion 601 of the second thrust member 600, the third frictional force is generated between the third portion 601 and the hub 200 (in some cases, also between the third portion 601 and the second plate 100B). In this case, the hub 200 is preferably able to slightly move in the axial direction (for example, move to the left side of the paper surface in FIG. 3) due to the pressing force described above. Accordingly, the hub 200 and the control plate 300 (the third portion 601) can reliably abut and slide.

By the way, by setting a spring force of the biasing member 700 to a large value in advance, the third frictional force can be constantly generated not only in the specific state described above but also when the disk plate 100 and the hub 200 rotate relative to each other. That is, as described above, when the first thrust member 500 is pressed against the control plate 300 by the biasing member 700, the control plate 300 presses the hub 200 in the axial direction, and finally the hub 200 abuts against and slides on the third portion 601 of the second thrust member 600 so that the third frictional force is generated.

In this way, when the biasing member 700 is set such that the third frictional force is constantly generated when the disk plate 100 and the hub 200 relatively rotate, and in the case of the above-mentioned specific state, in addition to the pressing force in the axial direction due to the biasing member 700, the pressing force in the axial direction input to the first sliding portion 303 of the control plate 300 described above is input to the hub 200. Accordingly, the third frictional force in the specific state is amplified as compared with the case other than the specific state.

When the third frictional force is constantly generated when the disk plate 100 and the hub 200 rotate relative to each other, the third frictional force can be used as a part of a relatively small hysteresis torque in the damper device 1 together with the first frictional force described above. In the specific state, the third frictional force is used as a relatively large hysteresis torque in conjunction with the second frictional force described above. The magnitude of the first frictional force and the third frictional force used as the relatively small hysteresis torque can be adjusted by appropriately changing the spring force of the biasing member 700 as described above. On the other hand, the magnitude of the second frictional force and the third frictional force used as the relatively large hysteresis torque can be adjusted by appropriately changing the magnitude of the pressing force input from the first plate 100A to the first sliding portion 303 of the control plate 300.

1-7. Biasing Member 700

As described above, the biasing member 700 is supported by the first plate 100A and disposed between the first plate 100A and the first portion 501 of the first thrust member 500. As the biasing member 700, a general disk spring can be used. The biasing member 700 biases the first thrust member 500 so as to press against the control plate 300. Accordingly, as described above, the first frictional force is generated between the first thrust member 500 and the control plate 300. The magnitude of the first frictional force can be varied by appropriately setting a spring constant of the disk spring. Further, when the spring constant of the disk spring is set appropriately and the spring force of the disk spring is increased, the biasing member 700 presses the first thrust member 500 against the control plate 300, the pressed control plate 300 further presses the hub 200 in the axial direction, and finally the hub 200 abuts against and slides on the third portion 601 of the second thrust member 600, and when the disk plate 100 and the hub 200 rotate relative to each other, the third frictional force can be constantly generated.

In this way, since the biasing member 700 according to the embodiment is used to generate the first frictional force and the third frictional force used as the relatively small hysteresis torque, it is possible to use a biasing member having a limited expansion and contraction stroke in the axial direction. Therefore, the damper device 1 according to the embodiment can have a compact axial length.

Further, the biasing member 700 biases the first plate 100A in a direction away from the control plate 300. Accordingly, when the specific state is not established, a separated state between the first sliding portion 303 (first concave-convex surface 303a) of the control plate 300 and the second concave-convex surface 110A of the first plate 100A is maintained.

2. Damper Device Operation

Figure 7:
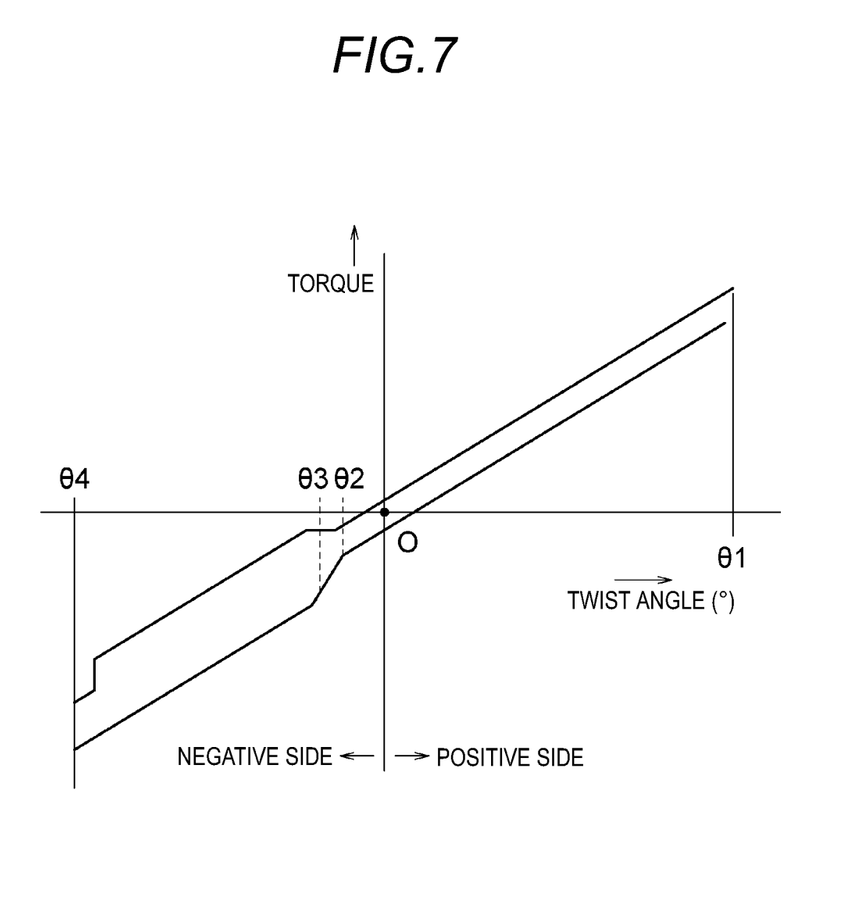
FIG. 7 is a schematic characteristic diagram showing a twist characteristic of the damper device according to the embodiment.

Next, the operation of the damper device 1 having the above configuration will be described with reference to FIGS. 7 and 8A to 8E. FIG. 7 is a schematic characteristic diagram showing a twist characteristic of the damper device 1 according to the embodiment. FIGS. 8A to 8E are schematic views schematically showing states in which the first plate 100A and the control plate 300 of the damper device 1 according to the embodiment are separated and abutted. In FIGS. 8A to 8E, a downward direction of the paper is referred to as the axial direction, and a left-right direction of the paper is referred to as the circumferential direction.

Figures 8A, 8B, 8C, 8D:
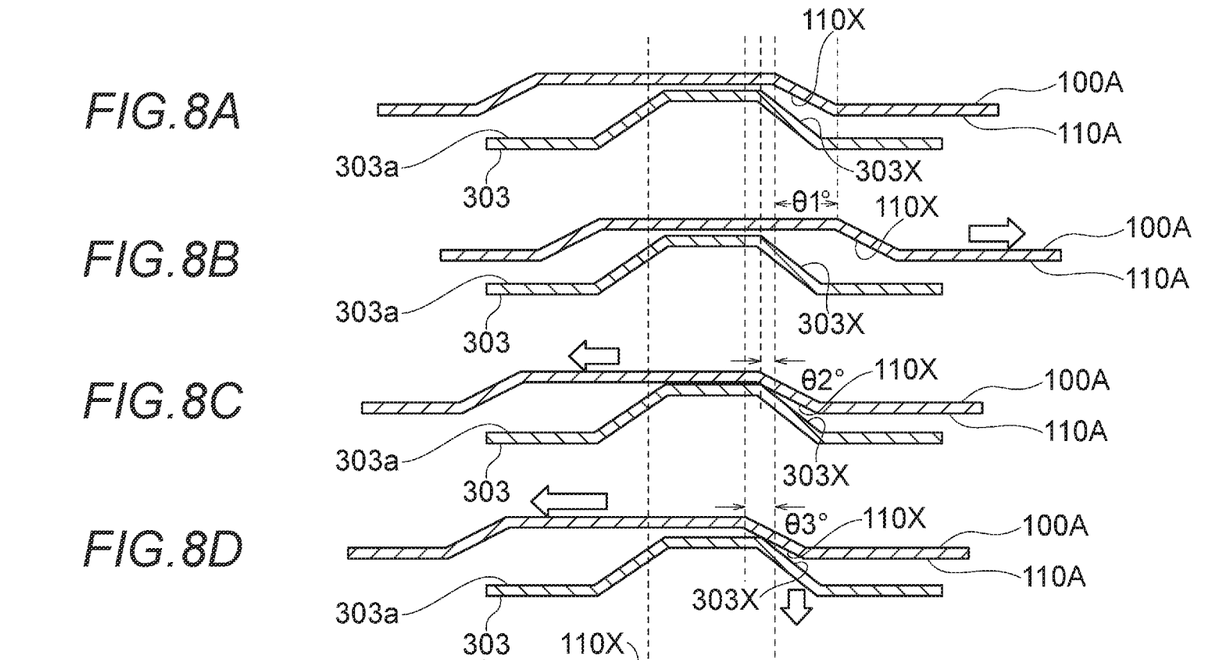
FIGS. 8A to 8E are schematic views showing states in which a first plate and the control plate of the damper device according to the embodiment are separated and abutted.

FIG. 8A shows a state in which the power from the driving source such as the engine or the motor is transmitted to the damper device 1 but no relative rotation occurs between the disk plate 100 and the hub 200 (twist angle 0°). In this case, the first plate 100A and the control plate 300 are separated from each other.

FIG. 8B shows a case where the relative rotation occurs between the disk plate 100 and the hub 200, and a twist of a twist angle θ° is generated on a positive side. Here, the positive side refers to, for example, a case where the disk plate 100 moves relative to the hub 200 in the right direction of the paper of FIG. 8B. In this case, for example, the disk plate 100 is moved to an R side of FIG. 1 relative to the hub 200. In this case, in other words, since the first plate 100A and the control plate 300 are always separated from each other, the above-mentioned second frictional force and third frictional force do not occur at the twist angles of 0° to θ1°. On the other hand, as described above, when the disk plate 100 and the hub 200 rotate relative to each other, the first frictional force is constantly generated as the small hysteresis torque (see FIG. 7). As shown in FIG. 7, the twist angle θ1° can be regarded as a maximum twist angle on the positive side in the relative rotation between the disk plate 100 and the hub 200 (that is, when twisted by θ1° to the positive side, the projections 207a to 207d of the hub 200 abut against the regulation portion 106 provided on the lining plate 101, and excessive relative rotation on the positive side of the twist angle θ1° or more is regulated).

Next, FIG. 8C shows a case where the relative rotation occurs between the disk plate 100 and the hub 200, and a twist of a twist angle θ2° is generated on a negative side. Here, the negative side refers to, for example, a case where the disk plate 100 moves relative to the hub 200 in the left direction of the paper of FIG. 8C. In this case, for example, the disk plate 100 is moved to an L side of FIG. 1 relative to the hub 200. In this case, that is, at the twist angle θ2°, the first concave-convex surface 303a of the control plate 300 (an inclined surface 303x of the first concave-convex surface 303a) abuts against the second concave-convex surface 110A of the first plate 100A (an inclined surface 110x of the second concave-convex surface 110A). Conversely, at twist angles of 0° to θ2°, the first plate 100A and the control plate 300 are still separated.

Next, FIG. 8D shows a case where the relative rotation occurs between the disk plate 100 and the hub 200, and a twist of a twist angle θ3° is further generated on the negative side. In this case, at the twist angles θ2° to θ3°, the second concave-convex surface 110A of the first plate 100A (the inclined surface 110x in the second concave-convex surface 110A) abuts against and slides on the first concave-convex surface 303a of the control plate 300 (the inclined surface 303x or the first concave-convex surface 303a), and the second concave-convex surface 110A presses the first concave-convex surface 303a in a push-down direction in the axial direction. Therefore, a pressing force in the axial direction (downward direction of the paper in FIG. 8(D)) is input to the control plate 300. Thus, by inputting the pressing force in the axial direction to the control plate 300, the above-mentioned second frictional force and third frictional force are generated in addition to the first frictional force. That is, since a total of the first frictional force, the second frictional force, and the third frictional force is a hysteresis torque at the twist angles θ2° to θ3°, a relatively large hysteresis torque is exhibited.

Figure 8E:
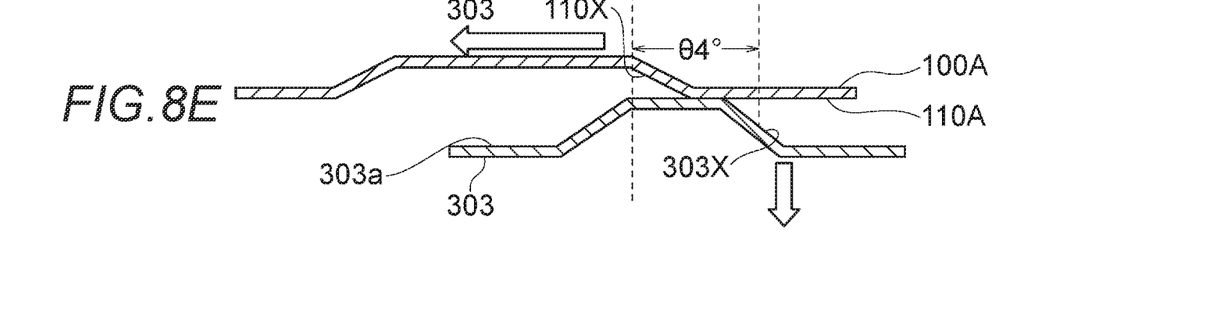

Next, FIG. 8E shows a case where the relative rotation occurs between the disk plate 100 and the hub 200, and a twist of a twist angle θ4° is further generated on the negative side. As shown in FIG. 7, the twist angle θ4° can be regarded as a maximum twist angle on the negative side in the relative rotation between the disk plate 100 and the hub 200 (that is, when twisted by θ4° to the negative side, the projections 207a to 207d of the hub 200 abut against the regulation portion 106 provided on the lining plate 101, and excessive relative rotation on the negative side of the twist angle θ4° or more is regulated). Between the twist angles θ2° to θ4°, the pressing force by which the second concave-convex surface 110A pushes down the first concave-convex surface 303a in the axial direction gradually increases, and between the twist angles θ3° and θ4°, the pressing force is constant (see FIG. 7). As described above, since the damper device 1 according to the embodiment can independently generate the first frictional force, the second frictional force, and the third frictional force at separate locations, it is possible to stably generate the hysteresis torque of various magnitudes according to the situations (according to the twist angle).

The relatively large hysteresis torque generated on the negative side as shown in FIGS. 7 and 8A to 8E is preferably used to absorb a torque fluctuation that occurs when the engine starts under some conditions in a state where the engine is stopped and the vehicle is driven only by the motor, for example, in a hybrid vehicle.

3. Modification

Figure 9:
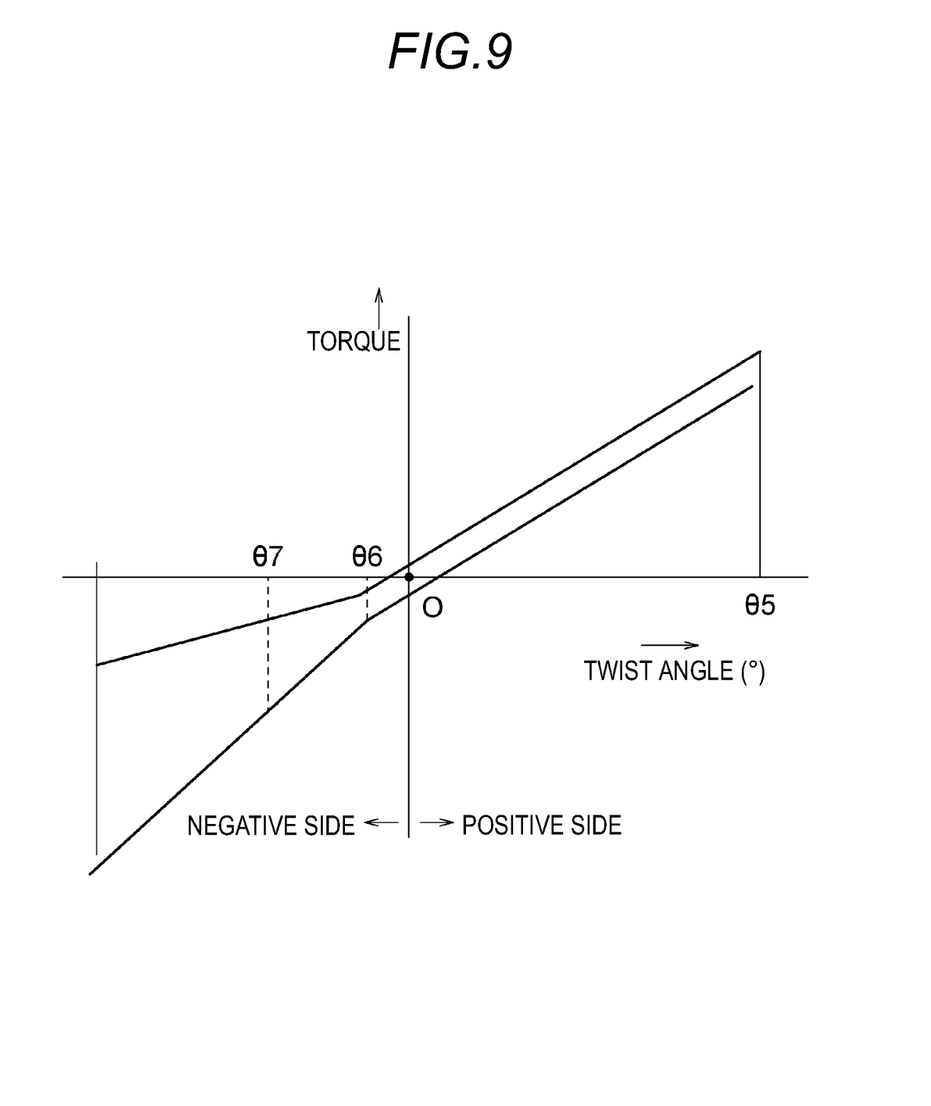
FIG. 9 is a schematic characteristic diagram showing a twist characteristic of a damper device according to another embodiment.

Next, a configuration of the damper device 1 according to another embodiment will be described with reference to FIGS. 9 and 10A to 10D. FIG. 9 is a schematic characteristic diagram showing a twist characteristic of the damper device 1 according to the present embodiment. FIGS. 10A to 10D are schematic views showing states in which the first plate 100A and the control plate 300 of the damper device 1 according to the present embodiment are separated and abutted.

Although the damper device 1 according to the present embodiment has substantially the same configuration as the damper device 1 according to the above-described embodiment, shapes of the second concave-convex surface 110A of the first plate 100A (the inclined surface 110x in the second concave-convex surface 110A) and the first concave-convex surface 303a of the control plate 300 (the inclined surface 303x of the first concave-convex surface 303a) are different from those of the above embodiment. In the damper device 1 according to the present embodiment, a detailed description of the same configuration as that of the damper device 1 according to the above embodiment will be omitted.

An inclination angle of the inclined surface 110x and the inclined surface 303x of the damper device 1 according to the present embodiment is gentle as compared with the above embodiment.

Figures 10A, 10B:
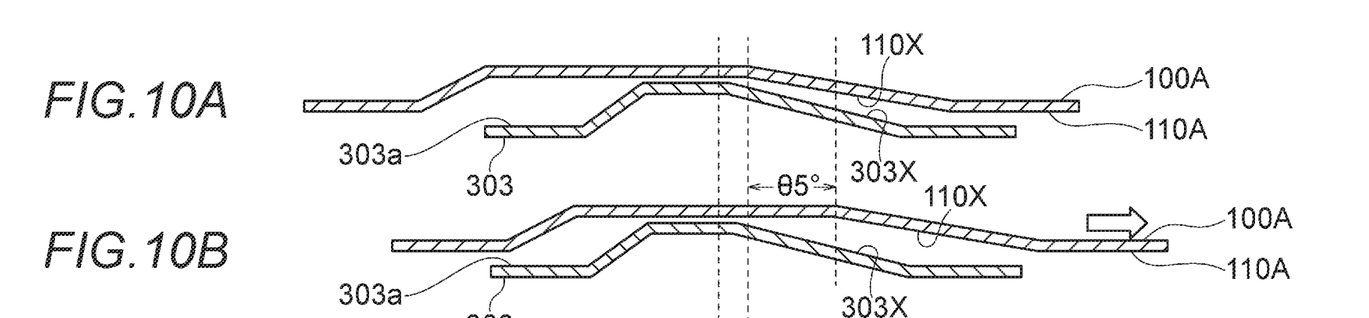
FIGS. 10A to 10D are schematic views showing states in which a first plate and a control plate of the damper device according to the embodiment are separated and abutted.

FIG. 10A shows a state in which power from a driving source such as an engine or a motor is transmitted to the damper device 1 but no relative rotation occurs between the disk plate 100 and the hub 200 (twist angle 0°). In this case, the first plate 100A and the control plate 300 are separated from each other.

FIG. 10B shows a case where the relative rotation occurs between the disk plate 100 and the hub 200 and a twist of a twist angle θ5° is generated on a positive side. In this case, in other words, since the first plate 100A and the control plate 300 are always separated from each other, the above-mentioned second frictional force and third frictional force do not occur at the twist angles of 0° to θ5°. On the other hand, as described above, when the disk plate 100 and the hub 200 rotate relative to each other, the first frictional force is constantly generated as a small hysteresis torque (see FIG. 9).

Figure 10C:
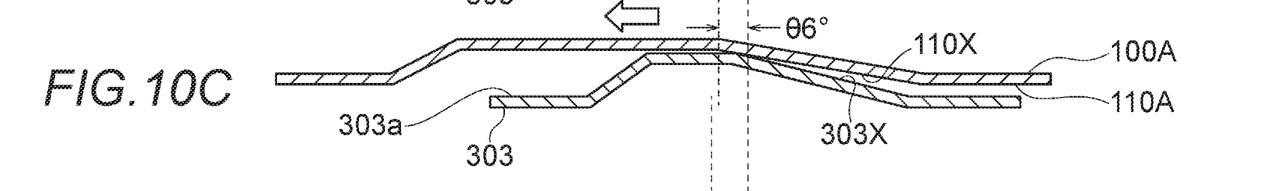

Next, FIG. 10C shows a case where the relative rotation occurs between the disk plate 100 and the hub 200 and a twist of a twist angle θ6° is generated on a negative side. In this case, that is, at the twist angle θ6°, the first concave-convex surface 303a of the control plate 300 (the inclined surface 303x of the first concave-convex surface 303a) abuts against the second concave-convex surface 110A of the first plate 100A (the inclined surface 110x of the second concave-convex surface 110A). Conversely, at twist angles of 0° to θ6°, the first plate 100A and the control plate 300 are still separated.

Figure 10D:
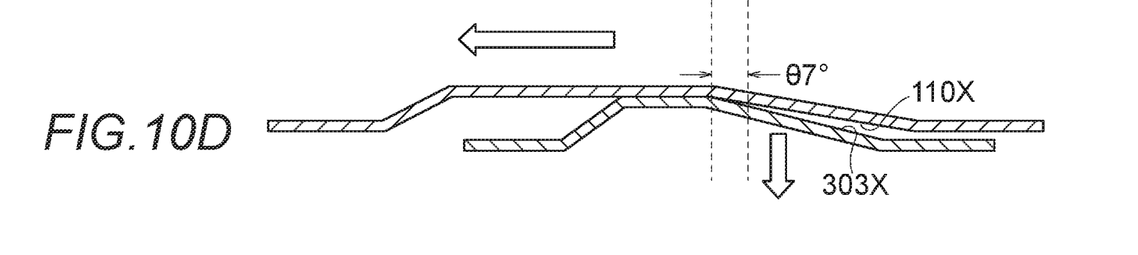

Next, FIG. 10D shows a case where the relative rotation occurs between the disk plate 100 and the hub 200 and a twist of a twist angle θ7° is further generated on the negative side. In this case, at the twist angles θ6° to θ7°, the second concave-convex surface 110A of the first plate 100A (the inclined surface 110x in the second concave-convex surface 110A) abuts against and slides on the first concave-convex surface 303a of the control plate 300 (the inclined surface 303x or the first concave-convex surface 303a), and the second concave-convex surface 110A presses the first concave-convex surface 303a in a push-down direction in the axial direction. Therefore, a pressing force in the axial direction (downward direction of the paper in FIG. 10(D)) is input to the control plate 300. Thus, by inputting the pressing force in the axial direction to the control plate 300, the above-mentioned second frictional force and third frictional force are generated in addition to the first frictional force. That is, since a total of the first frictional force, the second frictional force, and the third frictional force is a hysteresis torque at the twist angles θ6° to θ7°, a relatively large hysteresis torque is exhibited.

As described above, since the inclination angle of the inclined surface 110x and the inclined surface 303x is gentle as compared with the above embodiment, from the twist angle θ6° to θ7°, the pressing force input from the first plate 100A to the control plate 300 gradually increases as compared with the above embodiment. Therefore, as shown in FIG. 9, in the damper device 1 according to the present embodiment, a relatively large hysteresis torque gradually increases as the twist angle on the negative side increases. Accordingly, transition from the relatively small hysteresis torque to the relatively large hysteresis torque can be made smooth (an uncomfortable feeling of a change in characteristics felt by the user can be reduced).

A damper device according to an aspect of this disclosure includes a first rotary body including at least a first plate that rotates around a rotation shaft and a second plate that is disposed to face the first plate and integrally rotates with the first plate around the rotation shaft; a second rotary body that rotates relative to the first rotary body around the rotation shaft; a control plate that is disposed between the first plate and the second rotary body in an axial direction and is engaged with the second rotary body to rotate integrally with the second rotary body; a first thrust member at least a part of which is disposed between the first plate and the control plate in the axial direction and that is engaged with the first plate to rotate integrally with the first rotary body around the rotation shaft; and a second thrust member at least a part of which is disposed between the second plate and the second rotary body in the axial direction, and that is engaged with the second plate to rotate integrally with the first rotary body around the rotation shaft. The first thrust member is biased by a biasing member supported by the first plate in a direction to be pressed against the control plate to generate a first frictional force between the first thrust member and the control plate, the control plate is separated from the first plate in a case other than a specific state in which the second rotary body rotates relative to the first rotary body in a predetermined direction by a predetermined twist angle or more and abuts against and slides on the first plate in the specific state to generate a second frictional force between the control plate and the first plate, and the second thrust member abuts against and slides on the second rotary body to generate a third frictional force between the second thrust member and the second rotary body.

According to the damper device of this configuration, since locations for generating the first frictional force, the second frictional force, and the third frictional force are separated and independent, the expansion and contraction stroke of the biasing member can be made smaller than the expansion and contraction stroke of the disk spring in Reference 1. As a result, the damper device of the configuration has a compact axial length and is capable of stably generating hysteresis torque of various magnitudes depending on situations.

In the damper device according to the aspect, it is preferable that the control plate includes a claw portion that engages with the second rotary body, a first sliding portion that abuts against and slides on the first plate to generate the second frictional force in the specific state, a second sliding portion that abuts against and slides on the first thrust member to generate the first frictional force, and a coupling portion that couples the claw portion with the first sliding portion.

By making the control plate in this configuration, the second frictional force and the first frictional force can be reliably generated between the control plate and the first plate and between the control plate and the first thrust member. By adjusting the length in a radial direction of the coupling portion in the control plate, it is also possible to adjust the magnitude of the third frictional force in the specific state.

In the damper device according to the aspect, it is preferable that a gap extending in the radial direction is provided between the second rotary body and the coupling portion.

With this configuration, since elastic deformation of the coupling portion in the axial direction is allowed, the pressing force in the axial direction input from the first plate is reliably transmitted to the second rotary body via the coupling portion (the coupling portion serves as an operation diameter) in the specific state. Accordingly, the third frictional force can be reliably generated between the second thrust member and the second rotary body.

In the damper device according to the aspect, it is preferable that the first sliding portion is disposed radially outward than the claw portion and the second sliding portion is disposed radially inward than the claw portion.

With this configuration, the first frictional force generated by the second sliding portion can be used when generating a relatively small hysteresis torque, and the second frictional force generated by the first sliding portion can be used when generating a relatively large hysteresis torque. Whereby, the first frictional force and the second frictional force can be generated independently at different locations.

In the damper device according to the aspect, it is preferable that the first sliding portion has a first concave-convex surface that is uneven in the axial direction, and a second concave-convex surface corresponding to the first concave-convex surface is formed on a surface of the first plate that faces the first sliding portion.

With this configuration, the control plate and the first plate are separated from each other when other than the specific state, and in the specific state, it is possible to exhibit a pressing force in the axial direction from the first plate to the control plate while abutting the first plate against the control plate. As a result, in the specific state, the pressing force can be transmitted to the second rotary body via the coupling portion, and the third frictional force can be reliably generated between the second thrust member and the second rotary body. With the configuration, since the third frictional force can be generated in conjunction with the second frictional force at a location different from the location where the second frictional force is generated, a relatively large hysteresis torque can be reliably generated in the specific state.

In the damper device according to the aspect, it is preferable that the second concave-convex surface faces the first concave-convex surface and has a concave shape and a convex shape that are paired with a convex shape and a concave shape of the first concave-convex surface.

With this configuration, the control plate and the first plate are separated from each other more reliably when other than the specific state, and in the specific state, it is possible to exhibit a pressing force in the axial direction from the first plate to the control plate while abutting the first plate against the control plate.

In the damper device according to the aspect, it is preferable that the second rotary body is formed with a window hole that accommodates an elastic body that elastically couples the first rotary body with the second rotary body, and a groove that guides the claw portion and engages with the control plate.

With this configuration, since the damper device has a function of absorbing torque fluctuation mainly by the elastic body, it is possible to enhance the function of torque fluctuation absorption as a whole of the damper device. In addition, by providing the groove, the second rotary body and the control plate can be reliably engaged and be integrally rotated.

According to various embodiments, it is possible to provide a damper device having a compact axial length and capable of stably generating variations of hysteresis torque.

Although various embodiments have been illustrated as described above, the above embodiments are merely examples and are not intended to limit the scope of the disclosure. The above-described embodiments can be implemented in various other forms, and various omissions, substitutions, and changes can be made without departing from the spirit of the disclosure. Further, each configuration, shape, size, length, width, thickness, height, number and the like can be appropriately changed and implemented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damper device comprising:
    a first rotary body including at least a first plate that rotates around a rotation axis and a second plate that is disposed to face the first plate and integrally rotates with the first plate around the rotation axis;
    a second rotary body that rotates relative to the first rotary body around the rotation axis;
    a control plate that is disposed between the first plate and the second rotary body in an axial direction and is engaged with the second rotary body to rotate integrally with the second rotary body;
    a first thrust member at least a part of which is disposed between the first plate and the control plate in the axial direction and that is engaged with the first plate to rotate integrally with the first rotary body around the rotation axis; and
    a second thrust member at least a part of which is disposed between the second plate and the second rotary body in the axial direction and that is engaged with the second plate to rotate integrally with the first rotary body around the rotation axis, wherein
    the first thrust member is biased by a biasing member supported by the first plate in a direction to be pressed against the control plate to generate a first frictional force between the first thrust member and the control plate,
    the control plate is separated from the first plate in a case other than a specific state in which the second rotary body rotates relative to the first rotary body in a predetermined direction by a predetermined twist angle or more and abuts against and slides on the first plate in the specific state to generate a second frictional force between the control plate and the first plate, and
    the second thrust member abuts against and slides on the second rotary body to generate a third frictional force between the second thrust member and the second rotary body.

2. The damper device according to claim 1, wherein the control plate includes
    a claw portion that engages with the second rotary body,
    a first sliding portion that abuts against and slides on the first plate to generate the second frictional force in the specific state,
    a second sliding portion that abuts against and slides on the first thrust member to generate the first frictional force, and
    a coupling portion that couples the claw portion with the first sliding portion.

3. The damper device according to claim 2, wherein a gap extending in a radial direction is provided between the second rotary body and the coupling portion.

4. The damper device according to claim 2, wherein the first sliding portion is disposed radially outward than the claw portion and the second sliding portion is disposed radially inward than the claw portion.

5. The damper device according to claim 2, wherein the first sliding portion has a first concave-convex surface that is uneven in the axial direction, and a second concave-convex surface corresponding to the first concave-convex surface is formed on a surface of the first plate that faces the first sliding portion.

6. The damper device according to claim 5, wherein the second concave-convex surface faces the first concave-convex surface and has a concave shape and a convex shape that are paired with a convex shape and a concave shape of the first concave-convex surface.

7. The damper device according to claim 2, wherein the second rotary body is formed with a window hole that accommodates an elastic body that elastically couples the first rotary body with the second rotary body, and a groove that guides the claw portion and engages with the control plate.

* * * * *